June 27, 1944.  W. M. HANNEMAN  2,352,540
SELF-LOCKING SCREW
Filed Jan. 12, 1942  2 Sheets-Sheet 1
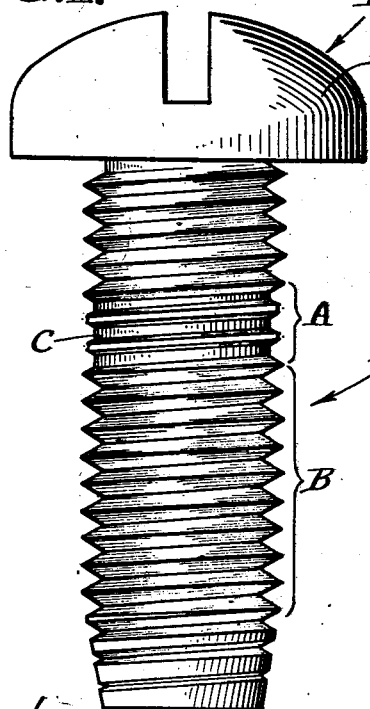
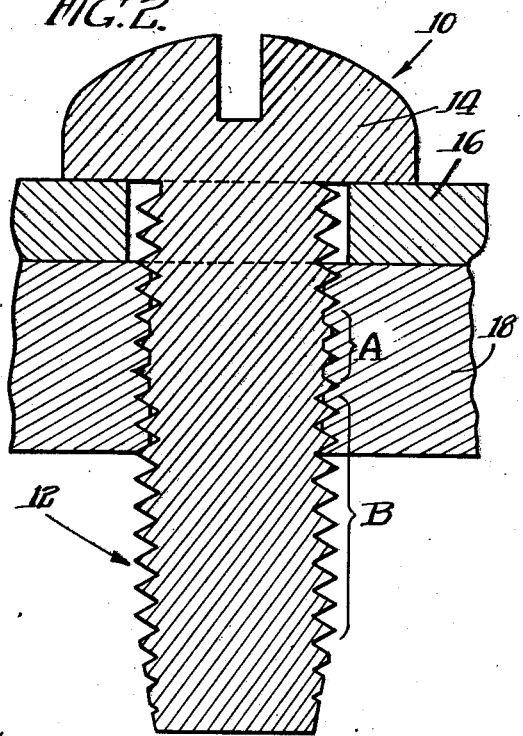
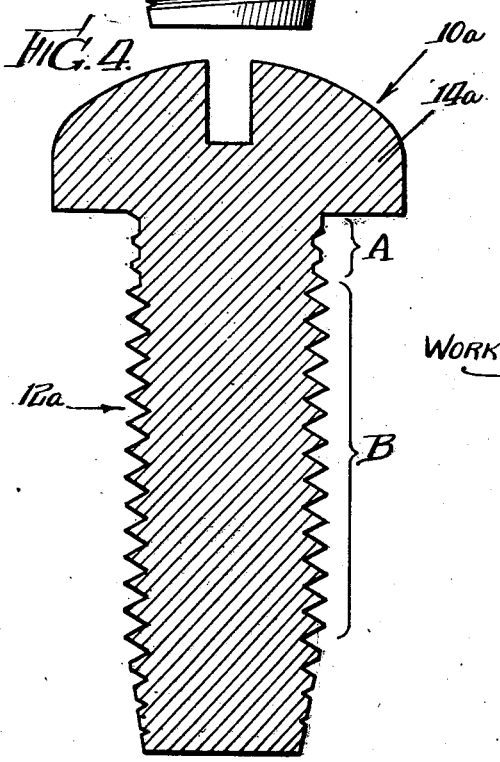
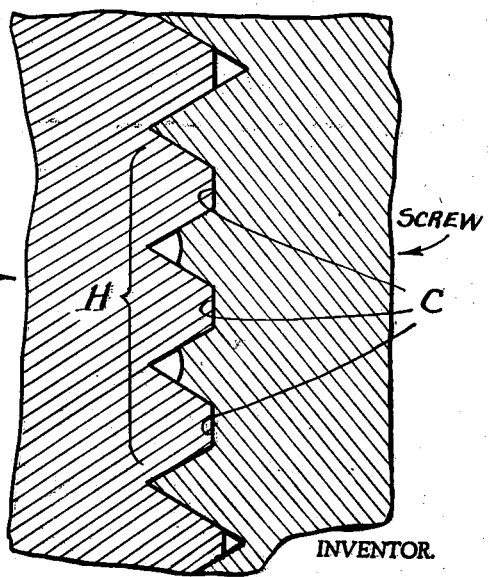
INVENTOR.
BY Walter M. Hanneman
Cox Moore & Olson June 27, 1944.  W. M. HANNEMAN  2,352,540
SELF-LOCKING SCREW
Filed Jan. 12, 1942  2 Sheets-Sheet 2
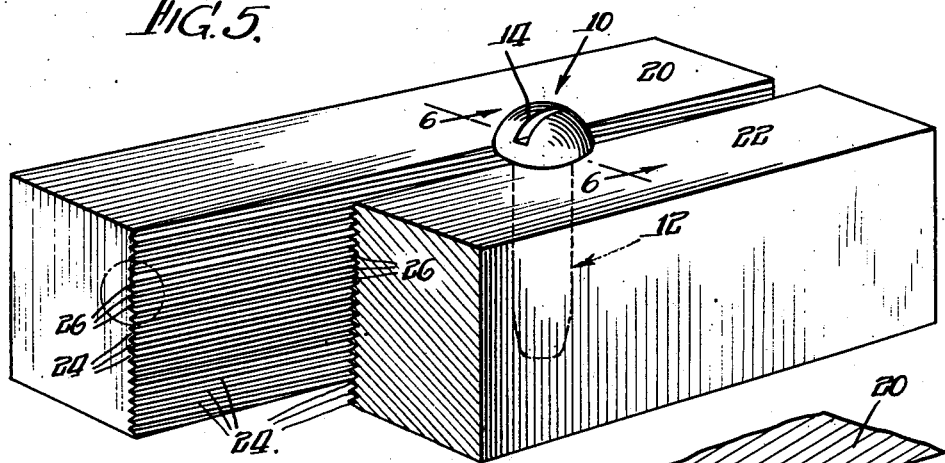
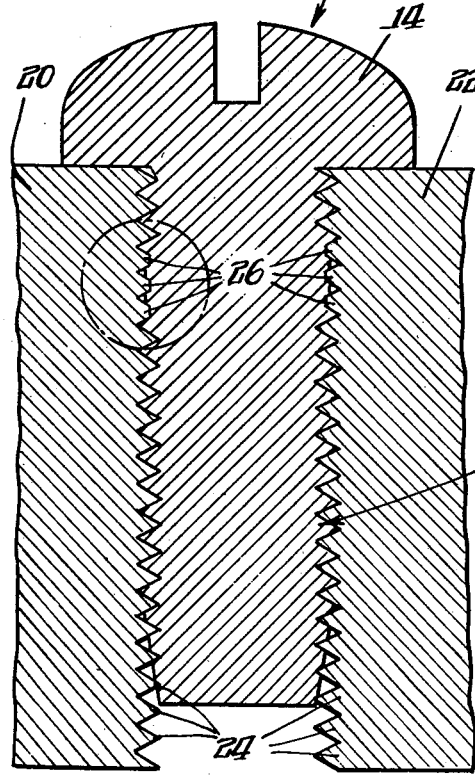
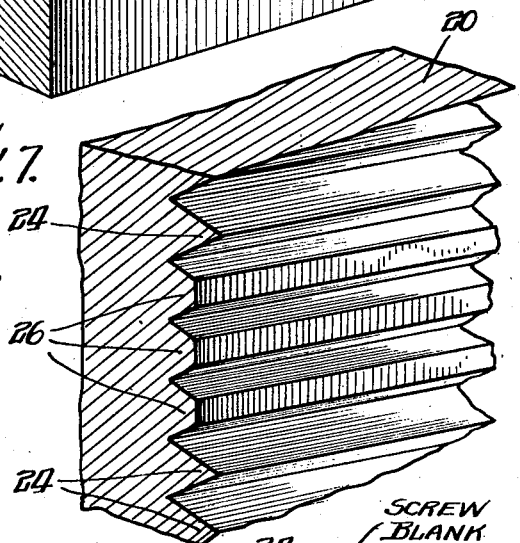
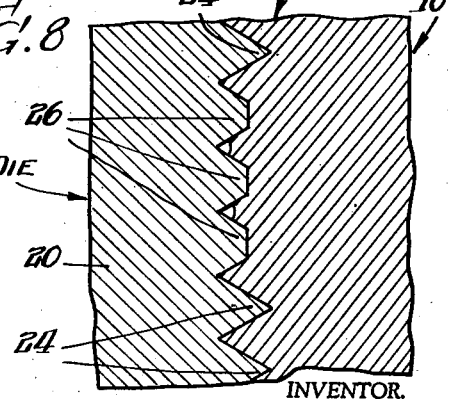
INVENTOR.
Walter M. Hanneman
BY: Cox Moore & Olson
attys.

Patented June 27, 1944

2,352,540

UNITED STATES PATENT OFFICE 2,352,540

SELF-LOCKING SCREW

Walter M. Hanneman, Oak Park, Ill., assignor to Illinois Tool Works, Chicago, Ill., a corporation of Illinois Application January 12, 1942, Serial No. 426,397

5 Claims. (Cl. 151—32)

This invention relates generally to locking screws and mechanism for producing same, and more particularly to locking screws of the type which depend for their locking effectiveness upon the impingement of the thread in a work piece.

It is an object of the present invention to provide a self-locking screw which when applied to a threaded aperture of a work piece will require minimum turning torque to establish sufficient impingement of the root portion of the thread in the screw with the crown portion of the thread in the work and thus render the screw secure against unauthorized retrograde rotation.

The present invention also contemplates a screw of the type set forth above which is not only self-locking but also self-sealing in the sense that when the screw is driven home within the work piece the engagement of the root portion of the thread in the screw with the crown portion of the thread in the work provides an effective fluid seal, the outer diameter of the thread associated with said root portion being reduced so as to facilitate application of the screw to the work.

It is a further object of the present invention to provide improved means in the form of thread rolling dies for producing in a screw blank of uniform diameter an enlarged root area adapted to engage the crown of the thread in a complementary work piece.

The foregoing and other objects and advantages will be more apparent from the following detailed description when considered in connection with the accompanying drawings, wherein—

Figure 1 is a side elevational view of a self-locking and sealing screw of the type contemplated by the present invention;

Figure 2 is a vertical sectional view taken centrally of the screw shown in Figure 1, the screw being shown in operative association with a work piece;

Figure 3 is an enlarged fragmentary sectional view of the locking and sealing portion of the screw shown in Figure 2;

Figure 4 is a central sectional view of a screw similar to that shown in Figure 1 with the locking and sealing section positioned immediately adjacent the clamping surface of the screw head;

Figure 5 is a perspective view of a pair of thread rolling dies and screw blank associated therewith, said dies being structurally arranged to produce from a blank, the screw disclosed in Figures 1 and 2, a portion of the die block or member in the foreground being broken away to more clearly illustrate the structural arrangement of the die serrations;

Figure 6 is a vertical sectional view of the die blocks and screw element taken substantially along the line 6—6 of Figure 5;

Figure 7 is an enlarged fragmentary perspective view of the portion of one of the die blocks within the confines of the dot and dash circle of Figure 5; and Figure 8 is an enlarged fragmentary sectional view of the portion of the die block and screw confined within the dot and dash circle of Figure 6.

Referring now to the drawings more in detail wherein like numerals have been employed to designate similar parts throughout the various figures, it will be seen that one embodiment of the present invention consists of a locking and sealing screw element designated generally by the numeral 10. The illustrated screw element 10 includes a threaded body or shank designated generally by the numeral 12 and a head 14 formed at one end thereof. The threaded body or shank 12 comprises two sections, one of which constitutes a locking or sealing section A and the other a leading section B positioned in advance of the section A. The extreme entering portion of the screw is preferably provided with a conventional taper to facilitate the ease of entrance within the aperture of a work piece.

Particular attention is directed to the fact that the thread convolutions on the leading section B are preferably of normal configuration. That is to say, these thread convolutions have normal root and outer diameters and are of conventional V-shaped cross-section. The thread convolutions of the leading section B of the screw 10 conform with machine screw standards.

The thread convolutions which comprise the locking and sealing section A are less in height than the thread convolutions on the section B and are axially spaced or separated at their bases by a helical locking or sealing surface C. This locking surface C forms the root of the thread convolutions of the locking section A and defines a diameter which is greater than the root diameter of the normal thread convolutions of the leading section B. Also the outer diameter of the thread convolutions forming the locking section A is less than the outer diameter of the thread convolutions of the leading section B.

In Figures 2 and 3 the screw 10 is shown in operative association with the work. It will be noted that the screw head clampingly engages the outer surface of an apertured work piece 16 and the locking or sealing section A is positioned within a work piece 18.

It will be apparent from the foregoing description that the leading section B may be freely inserted within the complementary thread convolutions of the work piece 18. When the locking section A of the screw reaches the complementary thread convolutions of the work piece 18, the surface area C lockingly and sealingly engages the crown of the thread in the work. This firm impingement of the surface C with the crown of the thread in the work establishes sufficient frictional resistance to secure the screw against unauthorized retrograde rotation and also establishes an effective seal to prevent fluid from passing axially of the screw along the thread convolutions thereof. In the enlarged disclosure of Figure 3 this tight locking and sealing engagement of the thread convolutions of the screw and the complementary thread convolutions of the work is clearly illustrated. It will be noted that the crown of the thread convolutions of the locking section partakes of an unfinished appearance, whereas the thread convolutions on the leading section are of normal V-shaped cross-section. While the thread convolutions of the locking section are slightly smaller in outer diameter than the thread convolutions of the leading section, and thus do not completely fill the valley of the thread in the work, this does not destroy the sealing effectiveness of the screw. Leakage along a conventional screw takes place between the valley of the screw thread and the crown of the thread in the work because in most instances the crown of the thread in the work does not extend into and completely fill the valley of the thread in the screw. It is well known to those skilled in the art that certain tolerances in hole sizes must be used to accommodate taps. Therefore, when the hole is tapped, the bottom of the thread in the work conforms with the desired conventional V-shape, whereas the crown of the thread in the work partakes of a somewhat roughened, flattened, unfinished appearance. By employing applicant's locking surface C which is slightly larger in diameter than the internal diameter of the thread convolutions in the work, firm frictional engagement of the crown of the thread in the work is accomplished.

In Figure 4 I have shown a slightly modified self-locking and sealing screw which is designated generally by the numeral 10a. This screw 10a is similar in all respects to the screw 10 except that the locking section A of the threaded shank 12a is positioned immediately adjacent the clamping side of the screw head 14a.

In Figure 5 I have shown a pair of relatively shiftable thread rolling die blocks 20 and 22 having working faces particularly designed for producing the screws 10 shown in Figures 1 and 2. The die serrations or teeth 24 for rolling the full size conventional thread convolutions of the leading section B are designated by the numeral 24, whereas the die serrations or teeth employed to roll the convolutions of the locking section A are designated by the numeral 26. The enlarged fragmentary disclosure of Figure 7 includes the area indicated within the dot and dash circle of Figure 5, whereas the enlarged sectional view of Figure 8 includes the area within the dot and dash circle of Figure 6. It will be seen that the die serrations or teeth 26 are of lesser height than the serrations 24 and that the crowns of the serrations 26 are truncated as compared with the conventional full V-shaped crown of the serrations 24. The die serrations or teeth 26 are preferably truncated an equal amount so as to produce a uniform root diameter in the locking section A larger than the root diameter of the thread of the entering or leading section B. Due to the fact that the truncated die serrations 26 do not penetrate the metal of the screw blank to a distance which is as great as the degree of penetration made by the teeth 24, an incomplete flat topped crown is produced on the thread convolutions of the locking section. This incomplete or flattened crown has an external diameter which is less than the external diameter of the thread convolutions included within the leading section B.

From the foregoing it will be apparent that the present invention contemplates an improved self-locking screw of the type wherein the root surface of the screw element is employed to lockingly and sealingly impinge the complementary crown portion of the thread convolutions in the work. The axial extent of the locking section may be determined to suit the particular needs incident to its use. Also, the locking section may be located at any point along the periphery of the screw blank.

It will also be apparent that the invention contemplates an improved self-locking screw wherein a locking section is provided in which the root diameter is greater than the root diameter of the thread convolutions of the leading section and the external diameter is smaller than the external diameter of the thread in the leading section. By having the external diameter of the locking section smaller, the screw may be used in instances where it is desirable to reduce frictional resistance and at the same time obtain maximum locking and sealing characteristics. By reducing the external diameter of the locking section, the locking and sealing effectiveness of the root portion of the screw is not in any way impaired and at the same time frictional resistance along the crown of the thread in the locking section is materially reduced.

The invention also contemplates the novel mechanism for producing the locking screw in the form of die blocks having a working surface of novel configuration. The extent to which the die teeth or serrations are truncated will determine the ultimate form and extent of the locking section on the finished screw element. These die members may be very economically produced by the use of conventional shop practices. It will also be noted that the invention provides mechanism for producing a locking screw of the type referred to above from a screw blank of uniform diameter. That is to say, it is not necessary to provide an enlarged, stepped portion of the screw blank in order to produce the enlarged root portion of the locking section. This makes for simplicity and economy in the production of locking screws of the type contemplated by the present invention.

Obviously changes or modifications in structural details may be made without departing from the spirit and scope of the appended claims.

The invention is hereby claimed as follows:

1. A self-locking screw device including a threaded shank, said threaded shank presenting a threaded locking section and a threaded leading section in advance thereof, the thread convolutions on said leading section being of normal root diameter, the thread of said locking section having an outer diameter which is less than the outer diameter of the thread on said leading section and having a root diameter which is sufficiently greater than the root diameter of the thread on said leading section to impinge the complementary crown portion of the thread in a work piece.

2. A self-locking screw device including a threaded shank, said threaded shank presenting a threaded locking section and a threaded leading section in advance thereof, the thread convolutions on said leading section being of normal root diameter, the thread convolutions of said locking section having an outer diameter which is less than the outer diameter of the thread on said leading section and being axially spaced from each other at their bases by a helical locking surface area having a diameter which is sufficiently greater than the root diameter of the thread on said leading section to impinge the complementary crown portion of the thread in a work piece.

3. A self-locking screw device including a threaded shank, said threaded shank presenting a threaded locking section and a threaded leading section in advance thereof, the thread convolutions on said leading section being of normal root diameter and adjacently positioned at their bases, the thread of said locking section having an outer diameter which is less than the outer diameter of the thread on said leading section and having a root diameter which is sufficiently greater than the root diameter of the thread on said leading section to impinge the complementary crown portion of the thread in a work piece.

4. A self-locking screw device including a threaded shank, said threaded shank presenting a threaded locking section and a threaded leading section in advance thereof, the thread convolutions of said leading section being of normal root diameter and normal V-shaped crown contour, the thread of said locking section having a root diameter which is sufficiently greater than the root diameter of the thread on said leading section to impinge the complementary crown portion of the thread in a work piece, the thread convolutions of said locking section being axially spaced at their bases and having a flattened crown contour.

5. A self-locking screw device including a threaded shank, said threaded shank presenting a locking section and a threaded leading section in advance thereof, the thread convolutions on said leading section being of normal root diameter and conforming with conventional machine screw standards, the thread on said locking section having the same axial pitch as the thread on the leading section and having an outer diameter which is less than the outer diameter of the thread on said leading section and a root diameter which is sufficiently greater than the root diameter of the thread on said leading section to impinge the complementary crown portion of the thread in a work piece.

WALTER M. HANNEMAN.